(12) United States Patent
Dhanda et al.

(10) Patent No.: US 12,120,539 B2
(45) Date of Patent: Oct. 15, 2024

(54) DYNAMIC TUNE-AWAY FOR NEIGHBOR CELL MEASUREMENTS

(71) Applicant: QUALCOMM Incorporated, San Diego, CA (US)

(72) Inventors: Mungal Singh Dhanda, Slough (GB); Umesh Phuyal, San Diego, CA (US); Bharat Shrestha, San Diego, CA (US); Prasad Reddy Kadiri, San Diego, CA (US); Alberto Rico Alvarino, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 17/444,464

(22) Filed: Aug. 4, 2021

(65) Prior Publication Data

US 2022/0046449 A1 Feb. 10, 2022

Related U.S. Application Data

(60) Provisional application No. 63/061,872, filed on Aug. 6, 2020.

(51) Int. Cl.
  *H04W 24/08* (2009.01)
  *G01N 35/00* (2006.01)
  *H04W 8/24* (2009.01)

(52) U.S. Cl.
  CPC ...... *H04W 24/08* (2013.01); *G01N 35/00871* (2013.01); *H04W 8/24* (2013.01); *G01N 2035/00881* (2013.01)

(58) Field of Classification Search
  CPC ........ H04W 24/08; H04W 24/10; H04W 8/24
  See application file for complete search history.

(56) References Cited

U.S. PATENT DOCUMENTS

| 2008/0189970 A1* | 8/2008 | Wang ................ H04W 36/0058 33/700 |
| 2011/0039577 A1* | 2/2011 | Stern-Berkowitz .......... H04L 5/0048 455/456.1 |
| 2016/0088534 A1* | 3/2016 | Axmon ................ H04L 5/0055 370/252 |
| 2016/0302098 A1* | 10/2016 | Gheorghiu .......... H04W 56/001 |

(Continued)

FOREIGN PATENT DOCUMENTS

| EP | 2739084 A1 | 6/2014 |
| EP | 3065443 A1 | 9/2016 |

(Continued)

OTHER PUBLICATIONS

International Search Report and Written Opinion—PCT/US2021/071114—ISA/EPO—Mar. 1, 2022.

(Continued)

*Primary Examiner* — Khaled M Kassim
*Assistant Examiner* — Hector Reyes
(74) *Attorney, Agent, or Firm* — Harrity & Harrity, LLP

(57) ABSTRACT

Various aspects of the present disclosure generally relate to wireless communication. In some aspects, a user equipment (UE) may receive an indication that a tune-away period is available. The UE may perform one or more neighbor cell measurements during the tune-away period based at least in part on the indication. Numerous other aspects are provided.

30 Claims, 7 Drawing Sheets

(56) References Cited

U.S. PATENT DOCUMENTS

| | | | | |
|---|---|---|---|---|
| 2016/0360450 | A1* | 12/2016 | Yang | H04W 76/34 |
| 2017/0026863 | A1* | 1/2017 | Wang | H04W 4/70 |
| 2018/0287591 | A1* | 10/2018 | Wang | H04W 36/0088 |
| 2019/0174341 | A1 | 6/2019 | Chincholi et al. | |
| 2021/0250828 | A1* | 8/2021 | Vaidya | H04W 24/08 |
| 2021/0367741 | A1* | 11/2021 | Yiu | H04W 36/0088 |
| 2022/0132348 | A1* | 4/2022 | Orsino | H04W 76/28 |

FOREIGN PATENT DOCUMENTS

| | | |
|---|---|---|
| WO | WO-2012112103 A1 | 8/2012 |
| WO | WO-2017027066 A1 | 2/2017 |

OTHER PUBLICATIONS

Qualcomm Inc: "Allowing PerCC-GapIndication in RRC Resume Procedure", 3GPP Draft, 3GPP TSG-RAN2 Meeting #97bis, R2-1703594-36331-MEASUREMENTGAP-RRCRESUME-V0, 3rd Generation Partnership Project (3GPP), Mobile Competence Centre, 650, Route Des Lucioles, F-06921 Sophia-Antipolis Cedex, France, vol. RAN WG2, No. Spokane, USA, Apr. 3, 2017-Apr. 7, 2017, Apr. 3, 2017 (Apr. 3, 2017), XP051245433, 6 Pages, Retrieved from the Internet: URL: http://www.3gpp.org/ftp/Meetings_3GPP_SYNC/RAN2/Docs/ [retrieved on Apr. 3, 2017] the whole document.

Intel Corporation: "Measurement Need for Gap Capability Transfer Enhancements for EN-DC and NR SA," 3GPP Draft, 3GPP TSG RAN WG2 Meeting #100, R2-1712693, 3rd Generation Partnership Project (3GPP), Mobile Competence Centre, 650, Route Des Lucioles, F-06921, Sophia-Antipolis Cedex, France, vol. RAN WG2. No. Reno, United State, Nov. 27, 2017-Dec. 1, 2017, Nov. 17, 2017 (Nov. 17, 2017), XP051371607, 6 pages, Retrieved from the Internet: URL: http://www.3gpp.org/ftp/tsg%5Fran/WG2%5FRL2/TSGR2%5F100/Docs/ [retrieved on Nov. 17, 2017], the whole document.

Partial International Search Report—PCT/US2021/071114—ISA/EPO—Nov. 23, 2021.

\* cited by examiner

DYNAMIC TUNE-AWAY FOR NEIGHBOR CELL MEASUREMENTS

CROSS-REFERENCE TO RELATED APPLICATION

This patent application claims priority to U.S. Provisional Patent Application No. 63/061,872, filed on Aug. 6, 2020, entitled "DYNAMIC TUNE-AWAY FOR NEIGHBOR CELL MEASUREMENTS," and assigned to the assignee hereof. The disclosure of the prior application is considered part of and is incorporated by reference into this Patent Application.

FIELD OF THE DISCLOSURE

Aspects of the present disclosure generally relate to wireless communication and to techniques and apparatuses for dynamic tune-away for neighbor cell measurements.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: receiving an indication that a tune-away period is available; and performing one or more neighbor cell measurements during the tune-away period based at least in part on the indication.

In some aspects, a method of wireless communication performed by a base station includes: transmitting, to a UE, an indication that a tune-away period is available; and avoiding scheduling downlink and uplink activity for the UE during the tune-away period based at least in part on the indication.

In some aspects, a UE for wireless communication includes: a memory and one or more processors coupled to the memory, the memory including instructions executable by the one or more processors to cause the UE to: receive an indication that a tune-away period is available; and perform one or more neighbor cell measurements during the tune-away period based at least in part on the indication.

In some aspects, a base station for wireless communication includes: a memory and one or more processors coupled to the memory, the memory including instructions executable by the one or more processors to cause the base station to: transmit, to a UE, an indication that a tune-away period is available; and avoid scheduling downlink and uplink activity for the UE during the tune-away period based at least in part on the indication.

In some aspects, a non-transitory computer-readable medium stores one or more instructions for wireless communication, the one or more instructions, when executed by one or more processors of a UE, cause the UE to: receive an indication that a tune-away period is available; and perform one or more neighbor cell measurements during the tune-away period based at least in part on the indication.

In some aspects, a non-transitory computer-readable medium stores one or more instructions for wireless communication, the one or more instructions, when executed by one or more processors of a base station, cause the base station to: transmit, to a UE, an indication that a tune-away period is available; and avoid scheduling downlink and uplink activity for the UE during the tune-away period based at least in part on the indication.

In some aspects, an apparatus for wireless communication includes: means for receiving an indication that a tune-away period is available; and means for performing one or more neighbor cell measurements during the tune-away period based at least in part on the indication.

In some aspects, an apparatus for wireless communication includes: means for transmitting, to a UE, an indication that a tune-away period is available; and means for avoiding scheduling downlink and uplink activity for the UE during the tune-away period based at least in part on the indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
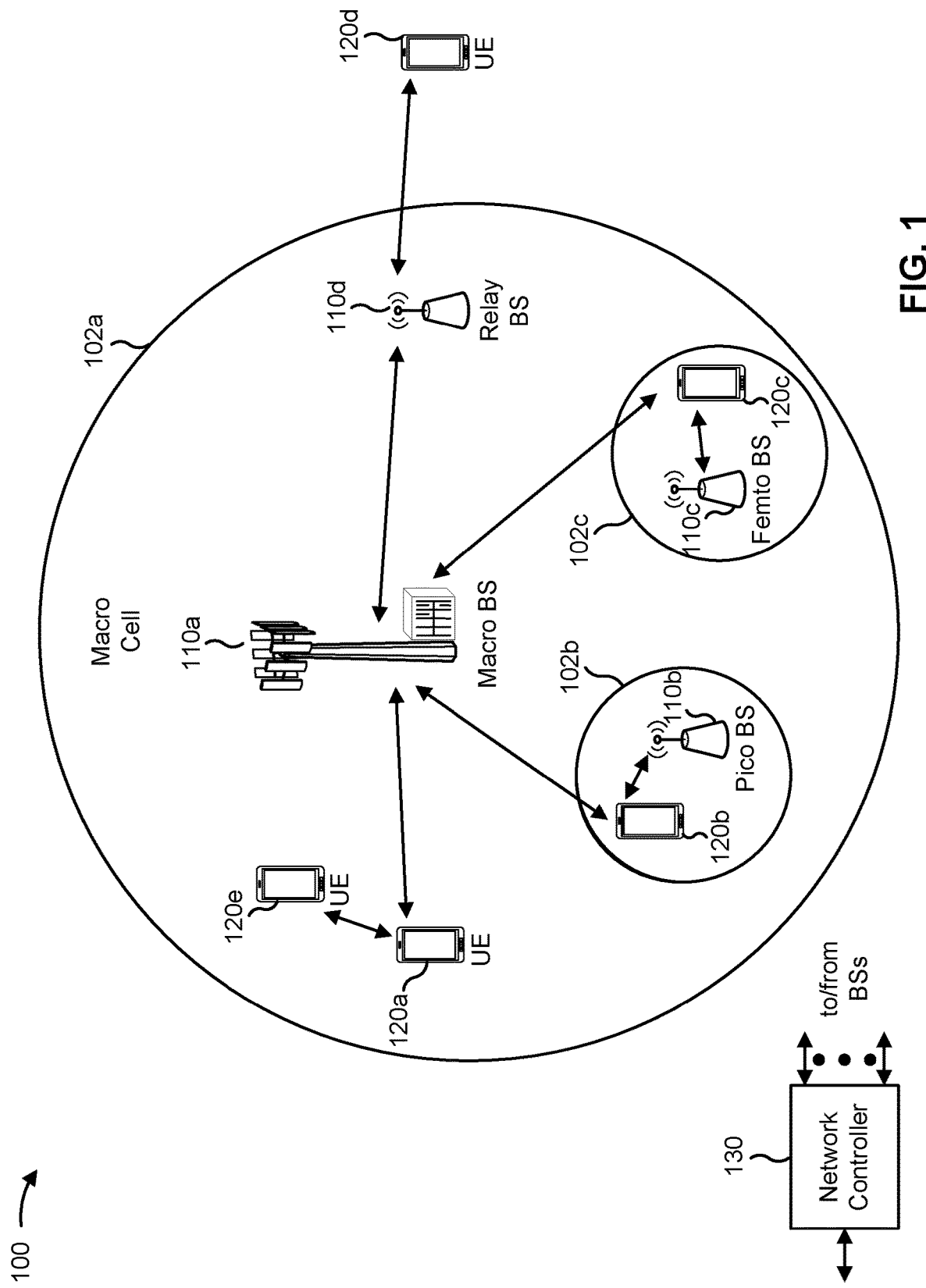
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
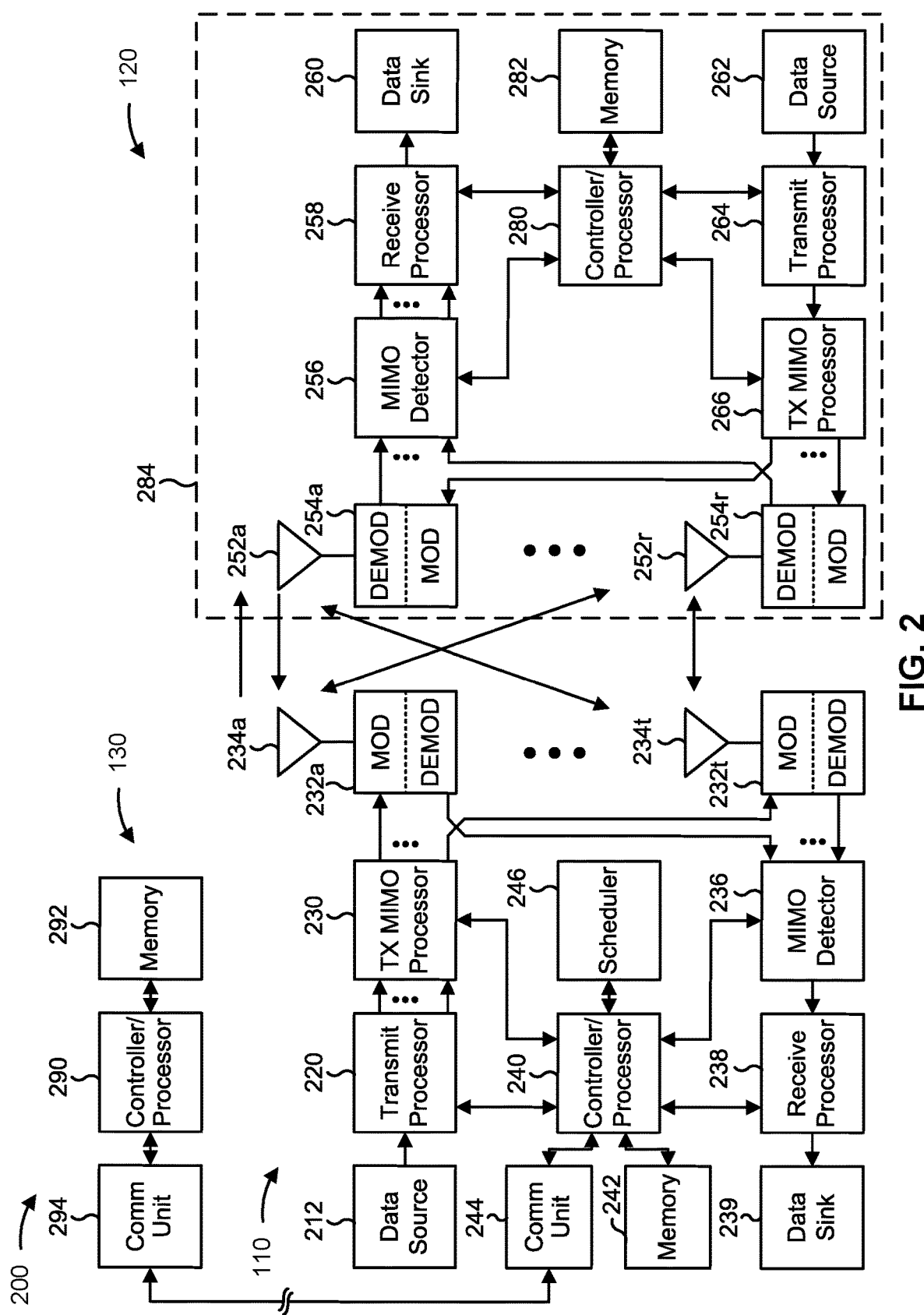
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-7).

Controller/processor 240 of base station 110, controller/processor 280 of UE 120, and/or any other component(s) of FIG. 2 may perform one or more techniques associated with dynamic tune-away for neighbor cell measurements, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving an indication that a tune-away period is available; and/or means for performing one or more neighbor cell measurements during the tune-away period based at least in part on the indication. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for transmitting, to a UE, an indication that a tune-away period is available; and/or means for avoiding scheduling downlink and uplink activity for the UE during the tune-away period based at least in part on the indication. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Narrowband communications involve communicating with a limited frequency bandwidth. One example of narrowband communication is NB-IoT communication, which may be limited to a single resource block (RB) of system bandwidth, e.g., 180 kHz. In some cases, a NB-IoT UE may have a single receiver capable of tuning to a single carrier at a time. In NB-IoT, a cell may have an anchor carrier, which is a carrier that is used for cell measurements and cell selection. The cell may also have one or more non-anchor carriers used to support dedicated channels for uplink and downlink communications for UEs.

NB-IoT may be used in cases involving small data transfers (e.g., the UE remains in a radio resource control (RRC) connected mode for a short period), mainly stationary UEs (e.g., a smart meter), and delay tolerant applications. However, NB-IoT may also be used in cases involving mobile UEs with small, but frequent, data transfers. For example, NB-IoT may be used for asset tracking, in which the UE sends tracking information frequently and without too long of a delay.

In NB-IoT, neighbor cell measurements are not currently required when a UE is in an RRC connected mode. A mobile UE may move from one cell to another cell, but currently in NB-IoT, the UE may perform neighbor cell measurements (e.g., cell detection measurements or signal strength measurements) only in an RRC idle mode. While the UE is in the RRC connected state, the UE may move out of coverage of the serving cell, which will lead to radio link failure. To recover from radio link failure, the UE may enter the RRC idle mode, perform neighbor cell measurements to identify a suitable cell, and then re-establish an RRC connection to continue the data transfer. However, performing the neighbor cell measurements when radio link failure occurs may take time and lead to long interruptions to data transfer or reachability due to the radio link failure.

Some techniques and apparatuses described herein enable a UE in an RRC connected mode to receive an indication from a base station that a tune-away period is available. The tune-away period may be a period in which the base station does not schedule any downlink and/or uplink activity. The UE may perform one or more neighbor cell measurements during the tune-away period, while in the RRC connected mode. The UE may tune away from a first carrier to a second carrier during the tune-away period to perform the one or more neighbor cell measurements. As a result, the UE may perform neighbor cell measurements while in the RRC connected mode, which allows the UE to immediately select a neighbor cell to connect to and initiate re-establishment of an RRC connection upon radio link failure. This may reduce the length of interruptions to data transfer or reachability due to radio link failure.

Figure 3:
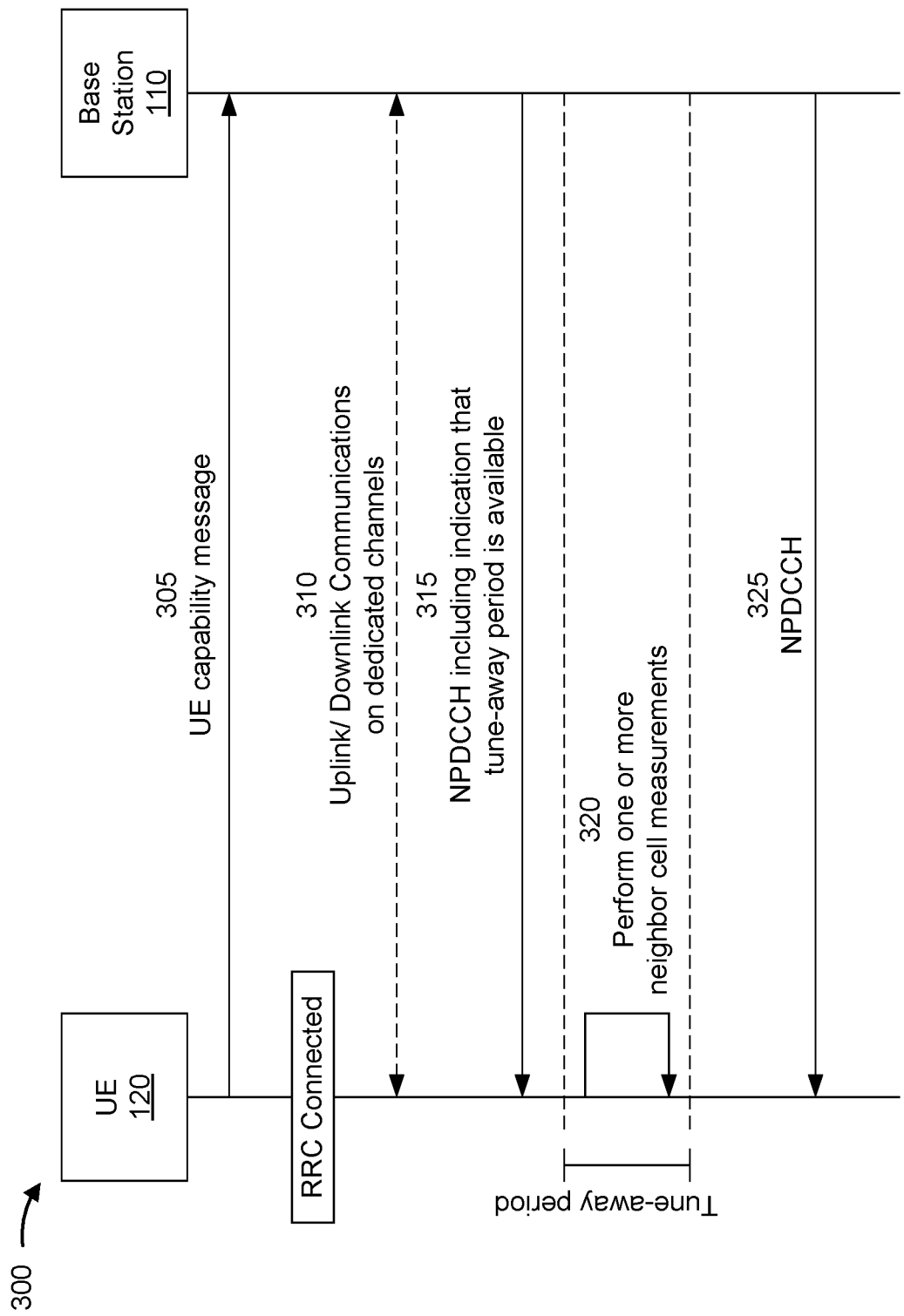
FIGS. 3-5 are diagrams illustrating examples associated with dynamic tune-away for neighbor cell measurements, in accordance with the present disclosure.

FIG. 3 is a diagram illustrating an example 300 associated with dynamic tune-away for neighbor cell measurements, in accordance with the present disclosure. As shown in FIG. 3, example 300 includes communication between a base station 110 and a UE 120. In some aspects, the base station 110 and the UE 120 may be included in a wireless network, such as wireless network 100. The base station 110 and the UE 120 may communicate on a wireless access link, which may include an uplink and a downlink. In some aspects, the UE 120 may be a NB-IoT UE.

As shown in FIG. 3, and by reference number 305, the UE 120 may send a UE capability message to the base station 110. For example, the UE capability message may be an RRC message including information relating to capabilities of the UE 120. In some aspects, the UE capability message may be transmitted to the base station 110 during an initial registration process in which the UE 120 establishes a connection with the base station 110.

The UE capability message may indicate a capability of the UE 120 relating to neighbor cell measurements in an RRC connected mode. In some aspects, the UE capability message may indicate whether the UE 120 supports RRC connected mode neighbor cell measurements and whether the UE 120 requires a tune-away period to perform RRC connected mode neighbor cell measurements. For example, the UE capability message may indicate that the UE 120 requires the tune-away period to perform RRC connected mode neighbor cell measurements if the UE 120 is capable of tuning to only one carrier at a time.

In some aspects, the UE capability message may indicate a capability of the UE 120 (e.g., whether the UE 120 requires the tune-away period) that is common for all frequency bands. In some aspects, the UE capability message may indicate that the capability of the UE 120 (e.g., whether the UE 120 requires the tune-away period) is frequency band specific. For example, the capability of the UE 120, indicated in the UE capability message, may be based at least in part on a frequency band of a carrier (e.g., an anchor carrier) associated with a neighbor cell, a frequency band of a carrier associated with a dedicated channel for communication with the base station 110 in the current cell, or a combination thereof. In this case, the UE 120 may require the tune-away period when the frequency band of the carrier associated with the dedicated channel is different than the frequency band of the carrier (e.g., the anchor carrier) of the neighbor cell.

The UE capability message may indicate one or more durations associated with the tune-away period. In some aspects, the UE capability message may indicate durations for different types of neighbor cell measurements to be performed during the tune-away period. For example, the UE capability message may indicate a first duration associated with a signal strength measurement (e.g., an RSRP measurement) of a neighbor cell and a second duration associated with a cell detection (e.g., PSS and/or SSS detection) measurement to detect a neighbor cell. In some aspects, the UE capability message may indicate a duration associated with the tune-away period that may be applied for all types of neighbor cell measurements. The one or more durations indicated in the UE capability message may be based at least in part on a time required for the UE 120 to perform the neighbor cell measurements.

As further shown in FIG. 3, and by reference number 310, when the UE 120 is in an RRC connected mode, the UE 120 may transmit uplink communications to and receive downlink communications from the base station 110 on one or more dedicated channels. For example, the UE 120 may receive downlink control channel communications on a downlink control channel, such as a narrowband physical downlink control channel (NPDCCH). In some aspects, the UE 120 may transmit uplink communications (e.g., physical uplink shared channel (PUSCH) communications) and/or receive downlink communications (e.g., physical downlink shared channel (PDSCH) communications) scheduled by the downlink control channel communications.

As further shown in FIG. 3, and by reference number 315, the base station 110 may transmit, to the UE 120, an indication that a tune-away period is available. The indication may be included in a downlink control channel communication, such as a NPDCCH communication. The tune-away period is a period in which the base station 110 will not schedule uplink and/or downlink activity for the UE 120.

In some aspects, base station 110 may determine that the tune-away period is available based on scheduled uplink and/or downlink activity for the UE 120, and may transmit the indication to the UE 120 based at least in part on the determination that the tune-away period is available. In some aspects, the indication may be based at least in part on the UE capability message received at the base station 110 from the UE 120. For example, the base station 110 may only transmit the indication that the tune-away period is available to a UE 120 if the UE capability message indicates that the UE 120 supports RRC connected mode neighbor cell measurements and the UE 120 requires a tune-away period to perform the neighbor cell measurements.

The indication may indicate to the UE 120 that the tune-away period begins once scheduled uplink and/or downlink activity for the UE 120 is complete. In some aspects, the indication may be included in a NPDCCH communication that also schedules uplink and/or downlink activity for the UE 120. In this case, the tune-away period may begin when the uplink and/or downlink activity scheduled by the NPDCCH message is complete.

In some aspects, the indication may indicate a duration of the tune-away period. For example, the duration of the tune-away period may be indicated in units of time (e.g., milliseconds) or units of NPDCCH periods. In some aspects, the base station 110 may select the duration of the tune-away period based at least in part on one or more durations indicated in the UE capability message, based at least in part on an amount of time available without scheduled uplink and/or downlink activity, and/or a combination thereof. In some aspects, the indication may indicate a purpose (e.g., a type of neighbor cell measurement) associated with the tune-away period. For example, the indication may indicate that the tune-away period is for a signal strength measurement (e.g., RSRP measurement) of a neighbor cell or a cell detection measurement (e.g., PSS/SSS detection) for detecting a neighbor cell.

In some aspects, based at least in part on a configuration of NPDCCH monitoring occasions for the UE 120, the UE 120 may have time to perform one or more neighbor cell measurements between NPDCCH periods in a case in which no uplink or downlink activity is scheduled for the UE 120 in an NPDCCH period. For example, a number of subframes between consecutive NPDCCH period may be based at least in part on values of a maximum NPDCCH repetition factor (Rmax) and a relative NPDCCH starting subframe periodicity (G) configured for the UE 120. In some cases, based at least in part on the configured Rmax and G values for the UE 120, the number of subframes between the NPDCCH periods for the UE 120 may provide a large enough duration for a tune-away period for the UE 120. In this case, the base station 110 may provide an implicit indication, to the UE 120, that a tune-away period (e.g., of a duration equal to the number of subframes between the NPDCCH periods) is available by not scheduling any uplink or downlink activity in an NPDCCH period.

As further shown in FIG. 3, and by reference number 320, the UE 120 may perform one or more neighbor cell measurements during the tune-away period based at least in part on the indication that the tune-away period is available. The base station 110 may avoid scheduling uplink and downlink activity for the UE 120 during the tune-away period. The UE 120 may perform the one or more neighbor cell measurements in the RRC connected mode during the tune-away period.

During the tune-away period, the UE 120 may tune away from a first carrier to a second carrier, and perform the one or more neighbor cell measurements on the second carrier. The first carrier may be a carrier associated with a dedicated channel for uplink and/or downlink communications with the base station 110 in a current cell. The second carrier may be a carrier associated with a neighbor cell for which the one or more cell measurements are to be performed. For example, the UE 120 may switch from a carrier associated with the dedicated channel in the current cell to an anchor carrier associated with a neighbor cell. In some aspects, the first carrier may be a non-anchor carrier associated with the dedicated channel in the current cell. In some aspects, the first carrier may be an anchor carrier associated with the dedicated channel in the current cell. In some aspects, the second carrier may be an anchor carrier of the neighbor cell. In some aspects, the second carrier may be a non-anchor carrier associated with the neighbor cell.

In some aspects, the UE 120 may tune away from the first carrier to the second carrier and perform the one or more neighbor cell measurements once the UE 120 has completed all uplink and/or downlink activity scheduled by the NPDCCH communication. For example, the UE 120 may tune away from the first carrier to the second carrier and perform the one or more neighbor cell measurements once the UE 120 has transmitted granted PUSCH communications, received scheduled PDSCH communications, and transmitted hybrid automatic repeat request (HARD) acknowledgements for the received PDSCH communications.

In some aspects, the neighbor cell measurements may include one or more signal strength measurements (e.g., RSRP measurements) for one or more neighbor cells. In some aspects, the neighbor cell measurements may include one or more cell detection (e.g., PSS/SSS detection) measurements to search for a neighbor cell on the second carrier used to perform the neighbor cell measurements. In some aspects, the indication received from the base station 110 may indicate a duration and/or a type of neighbor cell measurement associated with the tune-away period. In this case, the UE 120 may determine which type (or types) of neighbor cell measurements to perform based at least in part on the duration and/or the type of neighbor cell measurement indicated in the indication received from the base station 110.

As further shown in FIG. 3, and by reference number 325, after the tune-away period, the base station 110 may transmit a downlink control channel (e.g., NPDCCH) communication to the UE 120. The base station 110 avoids scheduling uplink and/or downlink activity for the UE 120 during the tune-away period. Once the tune-away period has ended, the base station 110 may then transmit a NPDCCH communication to the UE 120 to schedule uplink and/or downlink activity for the UE 120. After performing the one or more neighbor cell measurements during the tune-away period, the UE 120 may tune back to the first carrier (e.g., the carrier associated with the dedicated channel in the current cell) and monitor for NPDCCH communications from the base station 110.

As described above in connection with FIG. 3, the base station 110 may dynamically allocate a tune-away period for the UE 120 to perform neighbor cell measurements. The UE 120 may receive an indication from the base station 110 that the tune-away period is available. The tune-away period may be a period in which the base station does not schedule any downlink and/or uplink activity. The UE may perform one or more neighbor cell measurements during the tune-away period, while in the RRC connected mode. The UE may tune away from a first carrier to a second carrier during the tune-away period to perform the one or more neighbor cell measurements. As a result, the UE may perform neighbor cell measurements while in the RRC connected mode, which allows the UE to immediately select a neighbor cell to connect to and initiate re-establishment of an RRC connection upon radio link failure. This may reduce the length of interruptions to data transfer or reachability due to radio link failure.

As indicated above, FIG. 3 is provided as an example. Other examples may differ from what is described with respect to FIG. 3.

Figure 4:
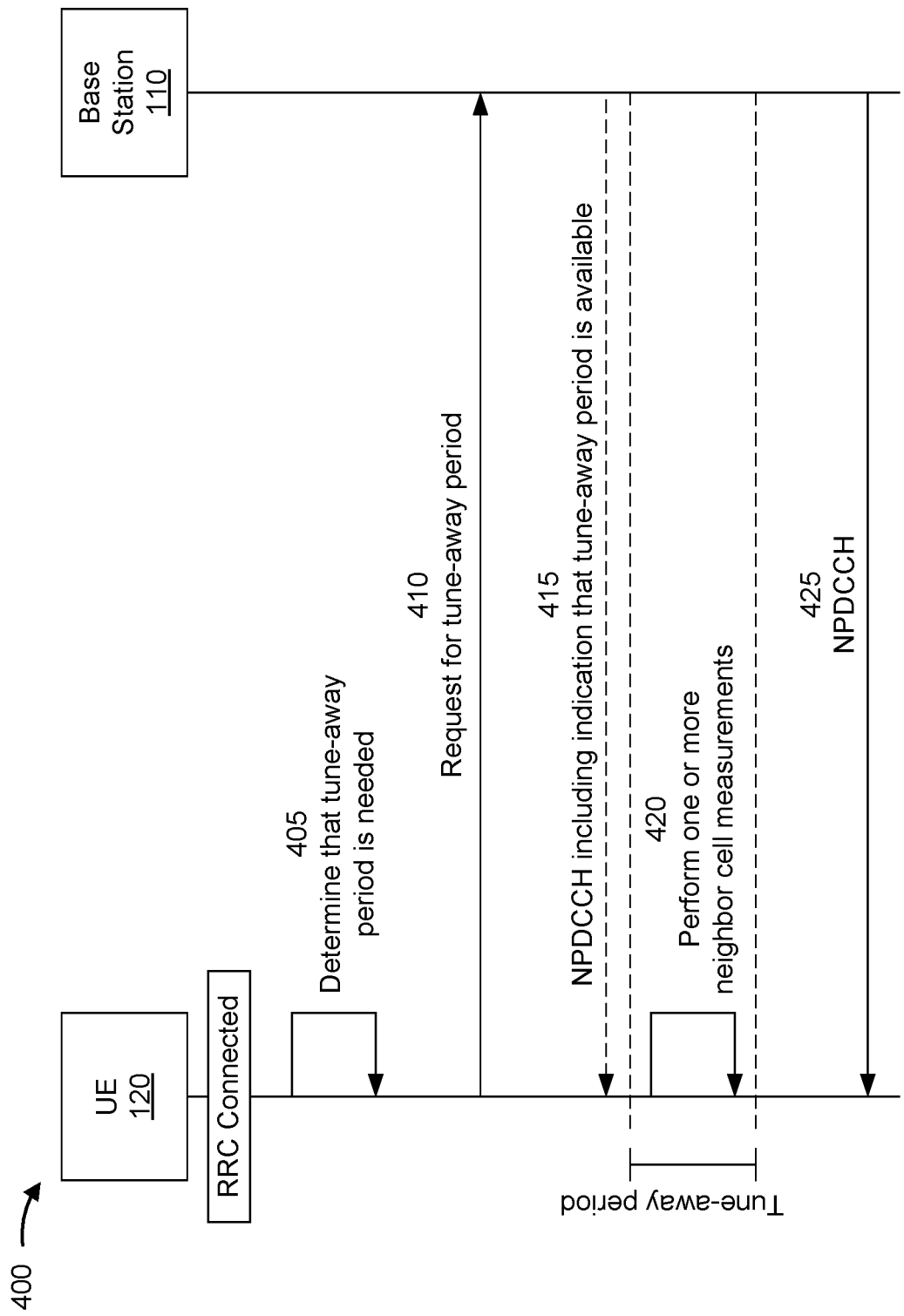

FIG. 4 is a diagram illustrating an example 400 associated with dynamic tune-away for neighbor cell measurements, in accordance with the present disclosure. As shown in FIG. 4, example 400 includes communication between a BS 110 and a UE 120. In some aspects, BS 110 and UE 120 may be included in a wireless network, such as wireless network 100. BS 110 and UE 120 may communicate on a wireless access link, which may include an uplink and a downlink. In some aspects, the UE 120 may be a NB-IoT UE.

As shown in FIG. 4, and by reference number 405, while in the RRC connected mode, the UE 120 may determine that a tune-away period is needed to perform one or more neighbor cell measurements. For example, the UE 120 may determine that the one or more neighbor cell measurements (e.g., signal strength measurements and/or cell detection measurements) are to be performed based at least in part on a mobility of the UE 120. The UE 120 may then determine that the tune-away period is needed to perform the one or more neighbor cell measurements based at least in part on a capability of the UE 120, a frequency band of a carrier associated with a neighbor cell, a frequency band of carrier associated with a dedicated channel in the current cell, and/or a combination thereof.

As further shown in FIG. 4, and by reference number 410, the UE 120 may transmit a request for a tune-away period to the base station 110. The request for the tune-away period may be included in an uplink medium access control (MAC) protocol data unit (PDU). For example, the request for the tune-away period may be included in a MAC control element (CE) in the MAC PDU.

In some aspects, the request for the tune-away period may include a requested duration for the tune-away period. In some aspects, the request for the tune-away period may include a purpose (e.g., a type of neighbor cell measurement) associated with the tune-away period. For example, the request may indicate that the tune-away period is for at least one of a signal strength measurement (e.g., RSRP measurement) of a neighbor cell or a cell detection (e.g., PSS/SSS detection) measurement to detect a neighbor cell.

As further shown in FIG. 4, and by reference number 415, the base station 110 may transmit, to the UE 120, an indication that the tune-away period is available. The base station 110 may transmit the indication that the tune-away period is available based at least in part on the request for the tune-away period received from the UE 120. The indication may be included in a downlink control channel communication, such as a NPDCCH communication. The tune-away period is a period in which the base station 110 will not schedule uplink and/or downlink activity for the UE 120.

In some aspects, when the base station 110 receives the request for the tune-away period, the base station 110 may determine when the requested tune-away period is available based on scheduled uplink and/or downlink activity for the UE 120. The base station 110 may then transmit the indication to the UE 120 based at least in part on the determination of when the tune-away period is available. In some aspects, the base station 110 may transmit, to the UE 120, one or more NPDCCH communications that schedule uplink and/or downlink activity for the UE 120 between receiving the request for the tune-away period and transmitting the NPDCCH communication that includes the indication that the tune-away period is available.

The indication may indicate to the UE 120 that the tune-away period begins once scheduled uplink and/or downlink activity for the UE 120 is complete. In some aspects, the indication may be included in a NPDCCH communication that also schedules uplink and/or downlink activity for the UE 120. In this case, the tune-away period may begin when the uplink and/or downlink activity scheduled by the NPDCCH message is complete.

In some aspects, the duration of tune-away period indicated by the indication may be the duration indicated in the request for the tune-away period transmitted by the UE 120. In some aspects, the duration of the tune-away period indicated by the indication may be a duration associated with a purpose (e.g., a type of neighbor cell measurement) indicated in the request for the tune-away period transmitted by the UE 120. For example, different purposes (e.g., different types of neighbor cell measurements) may be associated with different durations for the tune-away period. The durations for the different purposes may be predefined (e.g., in a wireless communication standard) or configured in system information blocks (SIBs).

In some aspects, based at least in part on receiving the request for the tune-away period from the UE 120, the base station 110 may schedule the tune-away period for the UE 110 by not scheduling any uplink or downlink communications for the UE 120 for one or more NPDCCH periods. In some aspects, based at least in part on a configuration of NPDCCH monitoring occasions for the UE 120, the UE 120 may have time to perform one or more neighbor cell measurements associated with the requested tune-away period between NPDCCH periods in a case in which no uplink or downlink activity is scheduled for the UE 120 in an NPDCCH period. For example, a number of subframes between consecutive NPDCCH period may be based at least in part on values of Rmax and G configured for the UE 120. In some cases, based at least in part on the configured Rmax and G values for the UE 120, the number of subframes between the NPDCCH periods for the UE 120 may provide a large enough duration for the tune-away period requested by the UE 120. In this case, based at least in part on receiving the request for the tune-away period from the UE 120, the base station 110 may not schedule any uplink or downlink communications for the UE 120 in an NPDCCH period. Furthermore, the base station 110 may not transmit, to the UE 120 an NPDCCH communication that schedules an uplink communication or a downlink communication. In this case, based at least in part on a number of subframes between NPDCCH periods for the UE 120 providing a large enough duration for the requested tune-away period, the lack of an NPDCCH, in an NPDCCH period, that schedules an uplink or downlink communication for the UE 120 may provide, to the UE 120, an implicit indication that the requested tune-away period is available between a current NPDCCH period and a next NPDCCH period.

As further shown in FIG. 4, and by reference number 420, the UE 120 may perform one or more neighbor cell measurements during the tune-away period based at least in part on the indication that the tune-away period is available. The base station 110 may avoid scheduling uplink and downlink activity for the UE 120 during the tune-away period. The UE 120 may perform the one or more neighbor cell measurements in the RRC connected mode during the tune-away period. During the tune-away period, the UE 120 may tune away from a first carrier to a second carrier, and perform the one or more neighbor cell measurements on the second carrier, as described above in connection with FIG. 3.

As further shown in FIG. 4, and by reference number 425, after the tune-away period, the base station 110 may transmit a downlink control channel (e.g., NPDCCH) communication to the UE 120. The base station 110 avoids scheduling uplink and/or downlink activity for the UE 120 during the tune-away period. Once the tune-away period has ended, the base station 110 may then transmit a NPDCCH communication to the UE 120 to schedule uplink and/or downlink activity for the UE 120. After performing the one or more neighbor cell measurements during the tune-away period, the UE 120 may tune back to the first carrier (e.g., the carrier associated with the dedicated channel in the current cell) and monitor for NPDCCH communications from the base station 110.

As described above in connection with FIG. 4, the UE 120 may dynamically request a tune-away period when the UE 120 determines that neighbor cell measurements are to be performed. The UE 120 may receive an indication from the base station 110 that the tune-away period is available based at least in part on the request from the UE 120. The tune-away period may be a period in which the base station does not schedule any downlink and/or uplink activity. The UE may perform one or more neighbor cell measurements during the tune-away period, while in the RRC connected mode. The UE may tune away from a first carrier to a second carrier during the tune-away period to perform the one or more neighbor cell measurements. As a result, the UE may perform neighbor cell measurements while in the RRC connected mode, which allows the UE to immediately select a neighbor cell to connect to and initiate re-establishment of an RRC connection upon radio link failure. This may reduce the length of interruptions due to radio link failure.

As indicated above, FIG. 4 is provided as an example. Other examples may differ from what is described with respect to FIG. 4.

Figure 5:
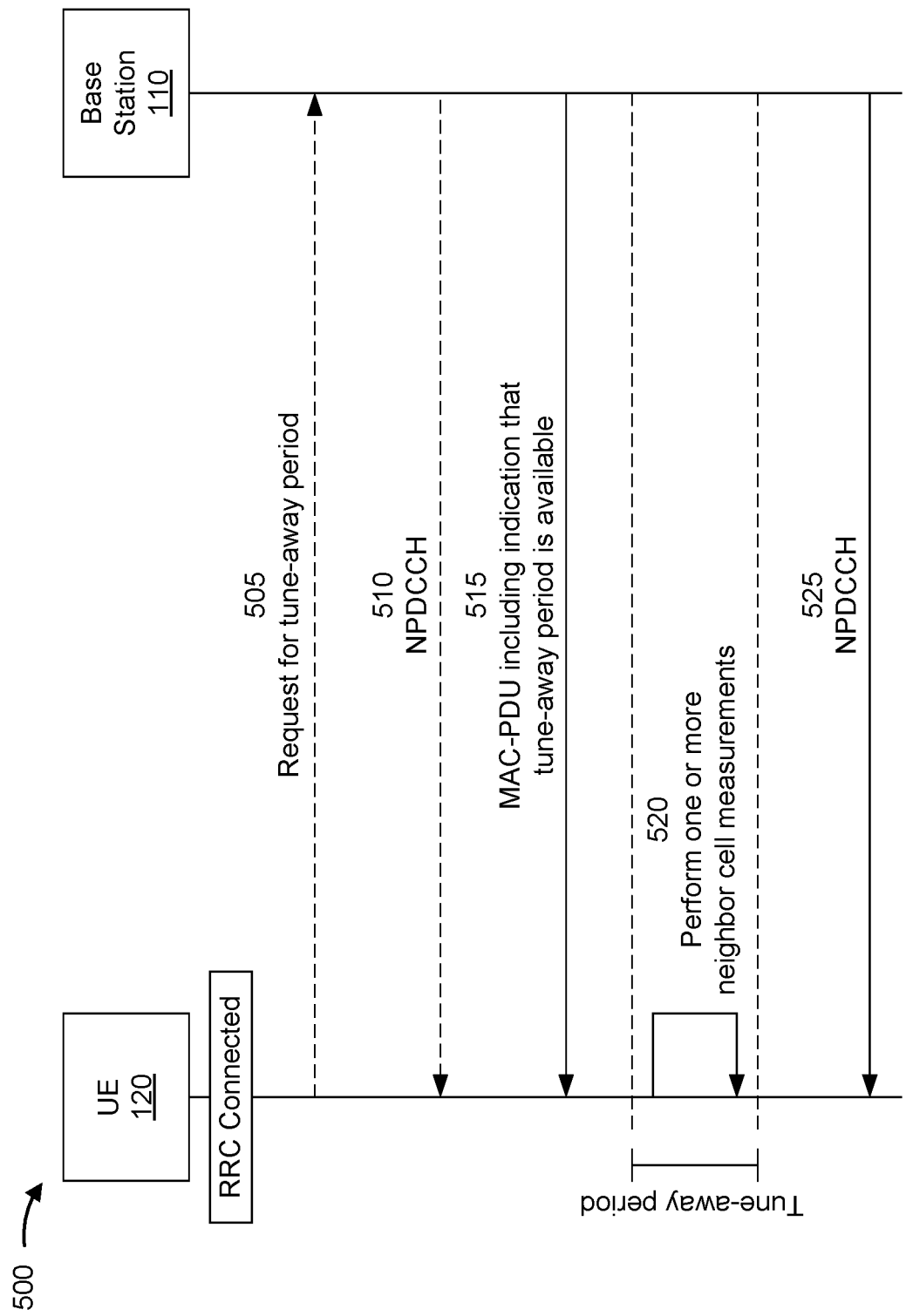

FIG. 5 is a diagram illustrating an example 500 associated with dynamic tune-away for neighbor cell measurements, in accordance with the present disclosure. As shown in FIG. 5, example 500 includes communication between a BS 110 and a UE 120. In some aspects, BS 110 and UE 120 may be included in a wireless network, such as wireless network 100. BS 110 and UE 120 may communicate on a wireless access link, which may include an uplink and a downlink. In some aspects, the UE 120 may be a NB-IoT UE.

As shown in FIG. 5, and by reference number 505, the UE 120 may transmit a request for a tune-away period to the base station 110. The request for the tune-away period may be included in an uplink medium access control MAC PDU. For example, the request for the tune-away period may be included in a MAC CE in the MAC PDU. In some aspects, the request for the tune-away period may include a requested duration for the tune-away period and/or a purpose (e.g., a type of neighbor cell measurement) associated with the tune-away period, as described above in connection with FIG. 4. The request for the tune-away period may be based at least in part on a determination, by the UE 120, that the tune-away period is needed for one or more neighbor cell measurements, as described above in connection with FIG. 4.

As further shown in FIG. 5, and by reference number 510, the base station 110 may transmit downlink control channel communication (e.g., a NPDCCH communication) to the UE 120. The downlink control channel communication may schedule uplink activity (e.g., one or more PUSCH communications) and/or downlink activity (e.g., one or more PDSCH communications) for the UE 120.

As further shown in FIG. 5, and by reference number 515, the base station 110 may transmit, to the UE 120, an indication that the tune-away period is available. As shown in FIG. 5, the indication may be included in a downlink MAC PDU. The tune-away period is a period in which the base station 110 will not schedule uplink and/or downlink activity for the UE 120.

As shown in the example of FIG. 5, the base station 110 may transmit the MAC PDU based indication that the tune-away period is available based at least in part on the request for the tune-away period received from the UE 120. In some aspects, the MAC PDU based indication that the tune-away period is available may be transmitted without the request for the tune-away period from the UE 120. For example, the MAC PDU based indication that the tune-away period is available may be based at least in part on a UE capability message, as described above in connection with FIG. 3.

In some aspects, the MAC PDU based indication may indicate to the UE 120 that the tune-away period begins once scheduled uplink and/or downlink activity for the UE 120 is complete. For example, the tune-away period may begin upon completion of the uplink and/or downlink activity scheduled by a NPDCCH message (e.g., 510 in FIG. 5) transmitted the UE 120 prior to the MAC PDU based indication. In some aspects, the MAC PDU based indication may explicitly indicate when the tune-away period begins.

In some aspects, the duration of tune-away period indicated by the MAC PDU based indication may be the duration indicated in the request for the tune-away period transmitted by the UE 120. In some aspects, the duration of the tune-away period indicated by the MAC PDU based indication may be a duration associated with a purpose (e.g., a type of neighbor cell measurement) indicated in the request for the tune-away period transmitted by the UE 120. For example, different purposes (e.g., different types of neighbor cell measurements) may be associated with different durations for the tune-away period. The durations for the different purposes may be predefined (e.g., in a wireless communication standard) or configured in SIB s.

In some aspects, the MAC PDU based indication may indicate a duration of the tune-away period. In some aspects, the MAC PDU based indication may indicate a purpose (e.g., a type of neighbor cell measurement) associated with the tune-away period. For example, the MAC PDU based indication may indicate that the tune-away period is for a signal strength measurement (e.g., RSRP measurement) of a neighbor cell or a cell detection measurement (e.g., PSS/SSS detection) for detecting a neighbor cell.

As further shown in FIG. 5, and by reference number 520, the UE 120 may perform one or more neighbor cell measurements during the tune-away period based at least in part on the indication that the tune-away period is available. The base station 110 may avoid scheduling uplink and downlink activity for the UE 120 during the tune-away period. The UE 120 may perform the one or more neighbor cell measurements in the RRC connected mode during the tune-away period. During the tune-away period, the UE 120 may tune away from a first carrier to a second carrier, and perform the one or more neighbor cell measurements on the second carrier, as described above in connection with FIGS. 3 and 4.

As further shown in FIG. 5, and by reference number 525, after the tune-away period, the base station 110 may transmit a downlink control channel (e.g., NPDCCH) communication to the UE 120. The base station 110 avoids scheduling uplink and/or downlink activity for the UE 120 during the tune-away period. Once the tune-away period has ended, the base station 110 may then transmit a NPDCCH communication to the UE 120 to schedule uplink and/or downlink activity for the UE 120. After performing the one or more neighbor cell measurements during the tune-away period, the UE 120 may tune back to the first carrier (e.g., the carrier associated with the dedicated channel in the current cell) and monitor for NPDCCH communications from the base station 110.

As indicated above, FIG. 5 is provided as an example. Other examples may differ from what is described with respect to FIG. 5.

Figure 6:
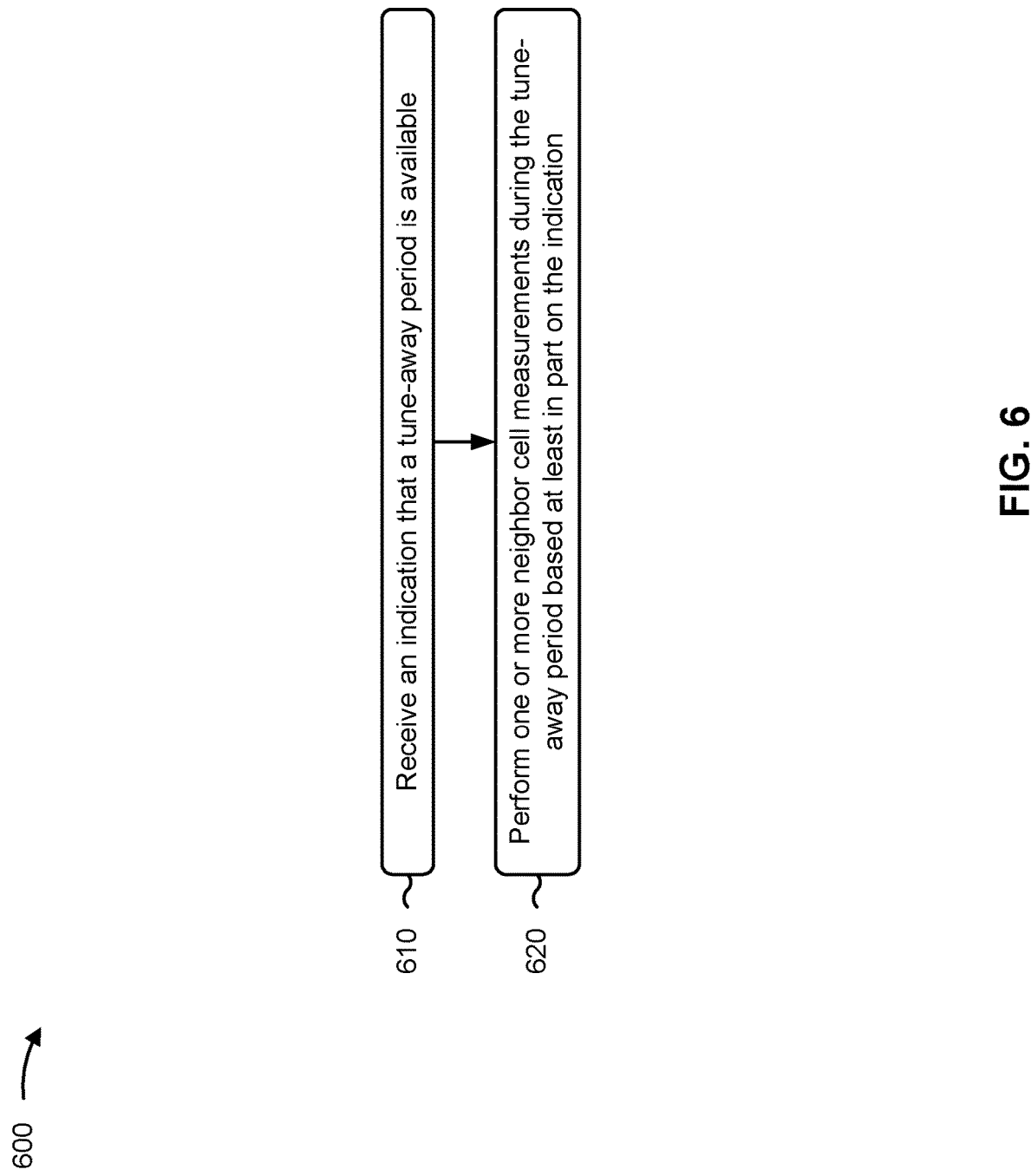
FIGS. 6-7 are diagrams illustrating example processes associated with dynamic tune-away for neighbor cell measurements, in accordance with the present disclosure.

FIG. 6 is a diagram illustrating an example process 600 performed, for example, by a UE, in accordance with the present disclosure. Example process 600 is an example where the UE (e.g., UE 120) performs operations associated with dynamic tune-away for neighbor cell measurements.

As shown in FIG. 6, in some aspects, process 600 may include receiving an indication that a tune-away period is available (block 610). For example, the UE (e.g., using antenna 252, demodulator 254, MIMO detector 256, receive processor 258, controller/processor 280, and/or memory 282) may receive an indication that a tune-away period is available, as described above.

As further shown in FIG. 6, in some aspects, process 600 may include performing one or more neighbor cell measurements during the tune-away period based at least in part on the indication (block 620). For example, the UE (e.g., using antenna 252, demodulator 254, MIMO detector 256, receive processor 258, transmit processor 264, TX MIMO processor 266, modulator 254, controller/processor 280, and/or memory 282) may perform one or more neighbor cell measurements during the tune-away period based at least in part on the indication, as described above.

Process 600 may include additional aspects, such as any single aspect or any combination of aspects described below and/or in connection with one or more other processes described elsewhere herein.

In a first aspect, the UE is a narrowband Internet of Things (NB-IoT) UE.

In a second aspect, alone or in combination with the first aspect, the performing the one or more neighbor cell measurements during the tune-away period comprises performing the one or more neighbor cell measurements in a radio resource control connected mode during the tune-away period.

In a third aspect, alone or in combination with one or more of the first and second aspects, the performing the one or more neighbor cell measurements during the tune-away period comprises tuning away from a first carrier to a second carrier, and performing the one or more neighbor cell measurements on the second carrier.

In a fourth aspect, alone or in combination with one or more of the first through third aspects, the first carrier is a carrier associated with a dedicated channel for communicating with a base station.

In a fifth aspect, alone or in combination with one or more of the first through fourth aspects, the first carrier is a non-anchor carrier associated with the dedicated channel for communicating with the base station.

In a sixth aspect, alone or in combination with one or more of the first through fifth aspects, the first carrier is an anchor carrier associated with the dedicated channel for communicating with the base station.

In a seventh aspect, alone or in combination with one or more of the first through sixth aspects, the second carrier is an anchor carrier.

In an eighth aspect, alone or in combination with one or more of the first through seventh aspects, the second carrier is a non-anchor carrier.

In a ninth aspect, alone or in combination with one or more of the first through eighth aspects, process 600 includes, prior to the receiving the indication that the tune-away period is available, transmitting, to a base station, a UE capability message that indicates a capability of the UE relating to neighbor cell measurements in a radio resource control connected mode.

In a tenth aspect, alone or in combination with one or more of the first through ninth aspects, that UE capability message indicates that the UE requires the tune-away period to perform the neighbor cell measurements in the radio resource control connected mode.

In an eleventh aspect, alone or in combination with one or more of the first through tenth aspects, the UE capability message indicates a duration associated with the tune-away period.

In a twelfth aspect, alone or in combination with one or more of the first through eleventh aspects, the UE capability message indicates a first duration associated with the tune-away period for a first type of neighbor cell measurement and a second duration associated with the tune-away period for a second type of neighbor cell measurement.

In a thirteenth aspect, alone or in combination with one or more of the first through twelfth aspects, the first type of neighbor cell measurement is a reference signal receive power measurement and the second type of neighbor cell measurement is a neighbor cell detection measurement.

In a fourteenth aspect, alone or in combination with one or more of the first through thirteenth aspects, the capability of the UE is based at least in part on a frequency band of carrier associated with a dedicated channel for communicating with a base station.

In a fifteenth aspect, alone or in combination with one or more of the first through fourteenth aspects, the capability of the UE is based at least in part on a frequency band of carrier associated with a neighbor cell.

In a sixteenth aspect, alone or in combination with one or more of the first through fifteenth aspects, process 600 includes, prior to the receiving the indication that the tune-away period is available, transmitting, to a base station, a request for the tune-away period to perform the one or more neighbor cell measurements.

In a seventeenth aspect, alone or in combination with one or more of the first through sixteenth aspects, the transmitting the request for the tune-away period to perform the one or more neighbor cell measurements is in response to a determination that the tune-away period is needed to perform the one or more neighbor cell measurements.

In an eighteenth aspect, alone or in combination with one or more of the first through seventeenth aspects, the request for the tune-away period is included in a medium access control protocol data unit.

In a nineteenth aspect, alone or in combination with one or more of the first through eighteenth aspects, the request for the tune-away period includes a requested duration of the tune-away period.

In a twentieth aspect, alone or in combination with one or more of the first through nineteenth aspects, the tune-away period is available for the requested duration.

In a twenty-first aspect, alone or in combination with one or more of the first through twentieth aspects, the request for the tune-away period includes a type of neighbor cell measurement associated with the tune-away period.

In a twenty-second aspect, alone or in combination with one or more of the first through twenty-first aspects, the tune-away period is available for a duration associated with the type of neighbor cell measurement included in the request.

In a twenty-third aspect, alone or in combination with one or more of the first through twenty-second aspects, the type of neighbor cell measurement associated with the tune-away period includes at least one of a reference signal receive power measurement or a neighbor cell detection measurement.

In a twenty-fourth aspect, alone or in combination with one or more of the first through twenty-third aspects, the indication is included in a downlink control channel communication.

In a twenty-fifth aspect, alone or in combination with one or more of the first through twenty-fourth aspects, the downlink control channel communication is a narrowband physical downlink control channel communication.

In a twenty-sixth aspect, alone or in combination with one or more of the first through twenty-fifth aspects, the indication indicates that the tune-away period begins when at least one of a scheduled uplink activity or a scheduled downlink activity is complete.

In a twenty-seventh aspect, alone or in combination with one or more of the first through twenty-sixth aspects, the indication indicates at least one of a duration associated with the tune-away period or a neighbor cell measurement type associated with the tune-away period.

In a twenty-eighth aspect, alone or in combination with one or more of the first through twenty-seventh aspects, the indication is included in a medium access control protocol distribution unit.

In a twenty-ninth aspect, alone or in combination with one or more of the first through twenty-eighth aspects, the performing the one or more neighbor cell measurements during the tune-away period comprises performing at least one of one or more reference signal receive power measurements for one or more neighbor cells or one or more cell detection measurements to detect one or more neighbor cells.

In a thirtieth aspect, alone or in combination with one or more of the first through twenty-ninth aspects, the indication is an implicit indication provided by a base station not scheduling an uplink communication or a downlink communication in a physical downlink control channel period.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
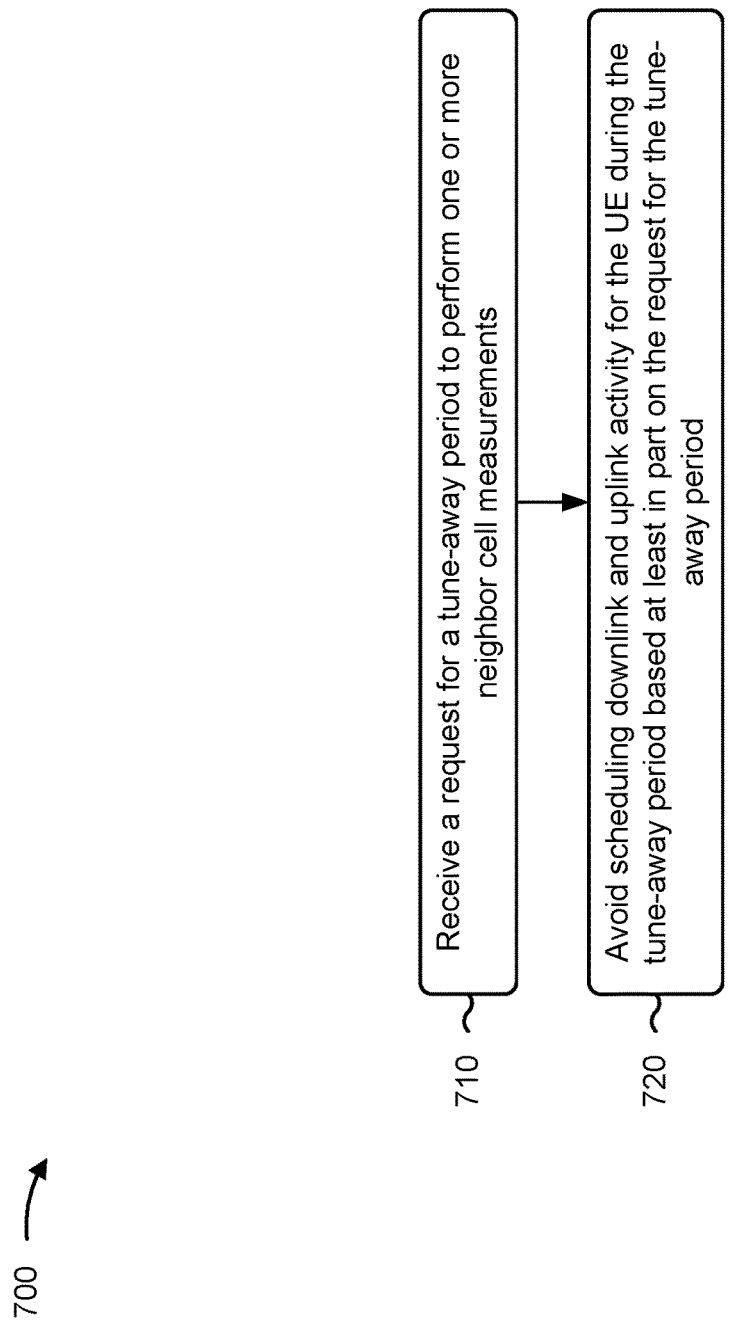

FIG. 7 is a diagram illustrating an example process 700 performed, for example, by a base station, in accordance with the present disclosure. Example process 700 is an example where the base station (e.g., base station 110) performs operations associated with dynamic tune-away for neighbor cell measurements.

As shown in FIG. 7, in some aspects, process 700 may include receiving, from a UE, a request for a tune-away period to perform one or more neighbor cell measurements (block 710). For example, the base station (e.g., using transmit processor 220, TX MIMO processor 230, modulator 232, antenna 234, controller/processor 240, memory 242, and/or scheduler 246) may receive, from a UE, a request for a tune-away period to perform one or more neighbor cell measurements, as described above.

As further shown in FIG. 7, in some aspects, process 700 may include avoiding scheduling downlink and uplink activity for the UE during the tune-away period based at least in part on the request for the tune-away period (block 720). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may avoid scheduling downlink and uplink activity for the UE during the tune-away period based at least in part on the request for the tune-away period, as described above.

Process 700 may include additional aspects, such as any single aspect or any combination of aspects described below and/or in connection with one or more other processes described elsewhere herein.

In a first aspect, the UE is an NB-IoT UE.

In a second aspect, alone or in combination with the first aspect, process 700 includes, receiving, from the UE, a UE capability message that indicates a capability of the UE relating to neighbor cell measurements in a radio resource control connected mode.

In a third aspect, alone or in combination with one or more of the first and second aspects, that UE capability message indicates that the UE requires the tune-away period to perform the neighbor cell measurements in the radio resource control connected mode.

In a fourth aspect, alone or in combination with one or more of the first through third aspects, the UE capability message indicates a duration associated with the tune-away period.

In a fifth aspect, alone or in combination with one or more of the first through fourth aspects, the UE capability message indicates a first duration associated with the tune-away period for a first type of neighbor cell measurement and a second duration associated with the tune-away period for a second type of neighbor cell measurement.

In a sixth aspect, alone or in combination with one or more of the first through fifth aspects, the first type of neighbor cell measurement is a reference signal receive power measurement and the second type of neighbor cell measurement is a neighbor cell detection measurement.

In a seventh aspect, alone or in combination with one or more of the first through sixth aspects, the capability of the UE is based at least in part on a frequency band of carrier associated with a dedicated channel for communicating with a base station.

In an eighth aspect, alone or in combination with one or more of the first through seventh aspects, the capability of the UE is based at least in part on a frequency band of carrier associated with a neighbor cell.

In a ninth aspect, alone or in combination with one or more of the first through eighth aspects, the request for the tune-away period is included in a medium access control protocol data unit.

In a tenth aspect, alone or in combination with one or more of the first through ninth aspects, the request for the tune-away period includes a requested duration of the tune-away period.

In an eleventh aspect, alone or in combination with one or more of the first through tenth aspects, the tune-away period is available for the requested duration.

In a twelfth aspect, alone or in combination with one or more of the first through eleventh aspects, the request for the tune-away period includes a type of neighbor cell measurement associated with the tune-away period.

In a thirteenth aspect, alone or in combination with one or more of the first through twelfth aspects, the tune-away period is available for a duration associated with the type of neighbor cell measurement included in the request.

In a fourteenth aspect, alone or in combination with one or more of the first through thirteenth aspects, the type of neighbor cell measurement associated with the tune-away period includes at least one of a reference signal receive power measurement or a neighbor cell detection measurement.

In a fifteenth aspect, along or in combination with one or more of the first through thirteenth aspects, process 700 includes transmitting, to the UE, an indication that the tune-away period is available based at least in part on receiving the request for the tune-away period.

In a sixteenth aspect, alone or in combination with one or more of the first through fifteenth aspects, the indication is included in a downlink control channel communication.

In a seventeenth aspect, alone or in combination with one or more of the first through sixteenth aspects, the downlink control channel communication is a narrowband physical downlink control channel communication.

In an eighteenth aspect, alone or in combination with one or more of the first through seventeenth aspects, the indication indicates that the tune-away period begins when at least one of a scheduled uplink activity or a scheduled downlink activity is complete.

In a nineteenth aspect, alone or in combination with one or more of the first through eighteenth aspects, the indication indicates at least one of a duration associated with the tune-away period or a neighbor cell measurement type associated with the tune-away period.

In a twentieth aspect, alone or in combination with one or more of the first through nineteenth aspects, the indication is included in a medium access control protocol distribution unit.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: receiving an indication that a tune-away period is available; and performing one or more neighbor cell measurements during the tune-away period based at least in part on the indication.

Aspect 2: The method of Aspect 1, wherein the UE is a narrowband Internet of Things (NB-IoT) UE.

Aspect 3: The method of any of Aspects 1-2, wherein the performing the one or more neighbor cell measurements during the tune-away period comprises: performing the one or more neighbor cell measurements in a radio resource control connected mode during the tune-away period.

Aspect 4: The method of any of Aspects 1-3, wherein the performing the one or more neighbor cell measurements during the tune-away period comprises: tuning away from a first carrier to a second carrier; and performing the one or more neighbor cell measurements on the second carrier.

Aspect 5: The method of Aspect 4, wherein the first carrier is a carrier associated with a dedicated channel for communicating with a base station.

Aspect 6: The method of Aspect 5, wherein the first carrier is a non-anchor carrier associated with the dedicated channel for communicating with the base station.

Aspect 7: The method of Aspect 5, wherein the first carrier is an anchor carrier associated with the dedicated channel for communicating with the base station.

Aspect 8: The method of any of Aspects 4-7, wherein the second carrier is an anchor carrier.

Aspect 9: The method of any of Aspects 4-7, wherein the second carrier is a non-anchor carrier.

Aspect 10: The method of any of Aspects 1-9, further comprising: prior to the receiving the indication that the tune-away period is available, transmitting, to a base station, a UE capability message that indicates a capability of the UE relating to neighbor cell measurements in a radio resource control connected mode.

Aspect 11: The method of Aspect 10, wherein that UE capability message indicates that the UE requires the tune-away period to perform the neighbor cell measurements in the radio resource control connected mode.

Aspect 12: The method of Aspect 11, wherein the UE capability message indicates a duration associated with the tune-away period.

Aspect 13: The method of Aspect 12, wherein the UE capability message indicates a first duration associated with the tune-away period for a first type of neighbor cell measurement and a second duration associated with the tune-away period for a second type of neighbor cell measurement.

Aspect 14: The method of Aspect 13, wherein the first type of neighbor cell measurement is a reference signal receive power measurement and the second type of neighbor cell measurement is a neighbor cell detection measurement.

Aspect 15: The method of any of Aspects 10-14, wherein the capability of the UE is based at least in part on a frequency band of carrier associated with a dedicated channel for communicating with a base station.

Aspect 16: The method of any of Aspects 10-15, wherein the capability of the UE is based at least in part on a frequency band of carrier associated with a neighbor cell.

Aspect 17: The method of any of Aspects 1-16, further comprising: prior to the receiving the indication that the tune-away period is available, transmitting, to a base station, a request for the tune-away period to perform the one or more neighbor cell measurements.

Aspect 18: The method of Aspect 17, wherein the transmitting the request for the tune-away period to perform the one or more neighbor cell measurements is in response to a determination that the tune-away period is needed to perform the one or more neighbor cell measurements.

Aspect 19: The method of any of Aspects 17-18, wherein the request for the tune-away period is included in a medium access control protocol data unit.

Aspect 20: The method of any of Aspects 17-19, wherein the request for the tune-away period includes a requested duration of the tune-away period.

Aspect 21: The method of Aspect 20, wherein the tune-away period is available for the requested duration.

Aspect 22: The method of any of Aspects 17-21, wherein the request for the tune-away period includes a type of neighbor cell measurement associated with the tune-away period.

Aspect 23: The method of Aspect 22, wherein the tune-away period is available for a duration associated with the type of neighbor cell measurement included in the request.

Aspect 24: The method of any of Aspects 22-23, wherein the type of neighbor cell measurement associated with the tune-away period includes at least one of a reference signal receive power measurement or a neighbor cell detection measurement.

Aspect 25: The method of any of Aspects 1-24, wherein the indication is included in a downlink control channel communication.

Aspect 26: The method of Aspect 25, wherein the downlink control channel communication is a narrowband physical downlink control channel communication.

Aspect 27: The method of any of Aspects 1-26, wherein the indication indicates that the tune-away period begins when at least one of a scheduled uplink activity or a scheduled downlink activity is complete.

Aspect 28: The method of any of Aspects 1-27, wherein the indication indicates at least one of a duration associated with the tune-away period or a neighbor cell measurement type associated with the tune-away period.

Aspect 29: The method of any of Aspects 1-24 or 26-27, wherein the indication is included in a medium access control protocol distribution unit.

Aspect 30: The method of any of Aspects 1-29, wherein the performing the one or more neighbor cell measurements during the tune-away period comprises: performing at least one of one or more reference signal receive power measurements for one or more neighbor cells or one or more cell detection measurements to detect one or more neighbor cells.

Aspect 31: The method of any of Aspects 1-24 or 30, wherein the indication is an implicit indication provided by a base station not scheduling an uplink communication or a downlink communication in a physical downlink control channel period.

Aspect 32: A method of wireless communication performed by a base station, comprising: receiving, from a user equipment (UE), a request for a tune-away period to perform one or more neighbor cell measurements; and avoiding scheduling downlink and uplink activity for the UE during the tune-away period based at least in part on the request for the tune-away period.

Aspect 33: The method of Aspect 32, wherein the UE is a narrowband Internet of Things (NB-IoT) UE.

Aspect 34: The method of any of Aspects 32-33, further comprising: receiving, from the UE, a UE capability message that indicates a capability of the UE relating to neighbor cell measurements in a radio resource control connected mode.

Aspect 35: The method of Aspect 34, wherein that UE capability message indicates that the UE requires the tune-away period to perform the neighbor cell measurements in the radio resource control connected mode.

Aspect 36: The method of Aspect 35, wherein the UE capability message indicates a duration associated with the tune-away period.

Aspect 37: The method of Aspect 36, wherein the UE capability message indicates a first duration associated with the tune-away period for a first type of neighbor cell measurement and a second duration associated with the tune-away period for a second type of neighbor cell measurement.

Aspect 38: The method of Aspect 37, wherein the first type of neighbor cell measurement is a reference signal receive power measurement and the second type of neighbor cell measurement is a neighbor cell detection measurement.

Aspect 39: The method of any of Aspects 34-38, wherein the capability of the UE is based at least in part on a frequency band of carrier associated with a dedicated channel for communicating with a base station.

Aspect 40: The method of any of Aspects 34-39, wherein the capability of the UE is based at least in part on a frequency band of carrier associated with a neighbor cell.

Aspect 41: The method of any of Aspects 32-40, wherein the request for the tune-away period is included in a medium access control protocol data unit.

Aspect 42: The method of any of Aspects 32-41, wherein the request for the tune-away period includes a requested duration of the tune-away period.

Aspect 43: The method of Aspect 42, wherein the tune-away period is available for the requested duration.

Aspect 44: The method of any of Aspects 32-43, wherein the request for the tune-away period includes a type of neighbor cell measurement associated with the tune-away period.

Aspect 45: The method of Aspect 44, wherein the tune-away period is available for a duration associated with the type of neighbor cell measurement included in the request.

Aspect 46: The method of any of Aspects 44-45, wherein the type of neighbor cell measurement associated with the tune-away period includes at least one of a reference signal receive power measurement or a neighbor cell detection measurement.

Aspect 47: The method of any of Aspects 31-46, further comprising: transmitting, to the UE, an indication that the tune-away period is available based at least in part on receiving the request for the tune-away period.

Aspect 48: The method of Aspect 47, wherein the indication is included in a downlink control channel communication.

Aspect 49: The method of Aspect 48, wherein the downlink control channel communication is a narrowband physical downlink control channel communication.

Aspect 50: The method of any of Aspects 47-49, wherein the indication indicates that the tune-away period begins when at least one of a scheduled uplink activity or a scheduled downlink activity is complete.

Aspect 51: The method of any of Aspects 47-50, wherein the indication indicates at least one of a duration associated with the tune-away period or a neighbor cell measurement type associated with the tune-away period.

Aspect 52: The method of any of Aspects 47 or 48-51, wherein the indication is included in a medium access control protocol distribution unit.

Aspect 53: A method of wireless communication performed by a base station, comprising: transmitting, to a user equipment (UE), an indication that a tune-away period is available; and avoiding scheduling downlink and uplink activity for the UE during the tune-away period based at least in part on the indication.

Aspect 54: The method of Aspect 53, wherein the UE is a narrowband Internet of Things (NB-IoT) UE.

Aspect 55: The method of any of Aspects 53-54, further comprising: prior to the transmitting the indication that the tune-away period is available, receiving, from the UE, a UE capability message that indicates a capability of the UE relating to neighbor cell measurements in a radio resource control connected mode.

Aspect 56: The method of Aspect 55, wherein that UE capability message indicates that the UE requires the tune-away period to perform the neighbor cell measurements in the radio resource control connected mode.

Aspect 57: The method of Aspect 56, wherein the UE capability message indicates a duration associated with the tune-away period.

Aspect 58: The method of Aspect 57, wherein the UE capability message indicates a first duration associated with the tune-away period for a first type of neighbor cell measurement and a second duration associated with the tune-away period for a second type of neighbor cell measurement.

Aspect 59: The method of Aspect 58, wherein the first type of neighbor cell measurement is a reference signal receive power measurement and the second type of neighbor cell measurement is a neighbor cell detection measurement.

Aspect 60: The method of any of Aspects 55-59, wherein the capability of the UE is based at least in part on a frequency band of carrier associated with a dedicated channel for communicating with a base station.

Aspect 61: The method of any of Aspects 55-60, wherein the capability of the UE is based at least in part on a frequency band of carrier associated with a neighbor cell.

Aspect 62: The method of any of Aspects 53-61, further comprising: prior to the transmitting the indication that the tune-away period is available, receiving, from the UE, a request for the tune-away period to perform one or more neighbor cell measurements.

Aspect 63: The method of Aspect 62, wherein the transmitting the indication that the tune-away period is available is based at least in part on the receiving, from the UE, the request for the tune-away period to perform the one or more neighbor cell measurements.

Aspect 64: The method of any of Aspects 62-63, wherein the request for the tune-away period is included in a medium access control protocol data unit.

Aspect 65: The method of any of Aspects 62-64, wherein the request for the tune-away period includes a requested duration of the tune-away period.

Aspect 66: The method of Aspect 65, wherein the tune-away period is available for the requested duration.

Aspect 67: The method of any of Aspects 62-66, wherein the request for the tune-away period includes a type of neighbor cell measurement associated with the tune-away period.

Aspect 68: The method of Aspect 67, wherein the tune-away period is available for a duration associated with the type of neighbor cell measurement included in the request.

Aspect 69: The method of any of Aspects 67-68, wherein the type of neighbor cell measurement associated with the tune-away period includes at least one of a reference signal receive power measurement or a neighbor cell detection measurement.

Aspect 70: The method of any of Aspects 53-69, wherein the indication is included in a downlink control channel communication.

Aspect 71: The method of Aspect 70, wherein the downlink control channel communication is a narrowband physical downlink control channel communication.

Aspect 72: The method of any of Aspects 53-71, wherein the indication indicates that the tune-away period begins when at least one of a scheduled uplink activity or a scheduled downlink activity is complete.

Aspect 73: The method of any of Aspects 53-72, wherein the indication indicates at least one of a duration associated with the tune-away period or a neighbor cell measurement type associated with the tune-away period.

Aspect 74: The method of any of Aspects 53-69 or 72-72, wherein the indication is included in a medium access control protocol distribution unit.

Aspect 75: An apparatus for wireless communication at a device, comprising a processor; memory coupled with the processor; and instructions stored in the memory and executable by the processor to cause the apparatus to perform the method of one or more of Aspects 1-31.

Aspect 76: An apparatus for wireless communication at a device, comprising a processor; memory coupled with the processor; and instructions stored in the memory and executable by the processor to cause the apparatus to perform the method of one or more of Aspects 32-52.

Aspect 77: An apparatus for wireless communication at a device, comprising a processor; memory coupled with the processor; and instructions stored in the memory and executable by the processor to cause the apparatus to perform the method of one or more of Aspects 53-74.

Aspect 78: A device for wireless communication, comprising a memory and one or more processors coupled to the memory, the one or more processors configured to perform the method of one or more of Aspects 1-31.

Aspect 79: A device for wireless communication, comprising a memory and one or more processors coupled to the memory, the one or more processors configured to perform the method of one or more of Aspects 32-52.

Aspect 80: A device for wireless communication, comprising a memory and one or more processors coupled to the memory, the one or more processors configured to perform the method of one or more of Aspects 53-74.

Aspect 81: An apparatus for wireless communication, comprising at least one means for performing the method of one or more of Aspects 1-31.

Aspect 82: An apparatus for wireless communication, comprising at least one means for performing the method of one or more of Aspects 32-52.

Aspect 83: An apparatus for wireless communication, comprising at least one means for performing the method of one or more of Aspects 53-74.

Aspect 84: A non-transitory computer-readable medium storing code for wireless communication, the code comprising instructions executable by a processor to perform the method of one or more of Aspects 1-31.

Aspect 85: A non-transitory computer-readable medium storing code for wireless communication, the code comprising instructions executable by a processor to perform the method of one or more of Aspects 32-52.

Aspect 86: A non-transitory computer-readable medium storing code for wireless communication, the code comprising instructions executable by a processor to perform the method of one or more of Aspects 53-74.

Aspect 87: A non-transitory computer-readable medium storing a set of instructions for wireless communication, the set of instructions comprising one or more instructions that, when executed by one or more processors of a device, cause the device to perform the method of one or more of Aspects 1-31.

Aspect 88: A non-transitory computer-readable medium storing a set of instructions for wireless communication, the set of instructions comprising one or more instructions that, when executed by one or more processors of a device, cause the device to perform the method of one or more of Aspects 32-52.

Aspect 89: A non-transitory computer-readable medium storing a set of instructions for wireless communication, the set of instructions comprising one or more instructions that, when executed by one or more processors of a device, cause the device to perform the method of one or more of Aspects 53-74.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories, the one or more memories comprising instructions executable by the one or more processors to cause the UE to:
      transmit, to a network entity, a request for a tune-away period to perform one or more neighbor cell measurements, wherein the request is included in a medium access control (MAC) control element (CE);
      receive an indication responsive to the request that the tune-away period is available, the indication indicating that the tune-away period is to begin when at least one of a scheduled uplink activity or a scheduled downlink activity is complete; and
      perform the one or more neighbor cell measurements to detect one or more neighbor cells based at least in part on one or more synchronization signals, wherein the one or more neighbor cell measurements are performed during the tune-away period based at least in part on the indication.

2. The UE of claim 1, wherein the instructions executable by the one or more processors to cause the UE to perform the one or more neighbor cell measurements during the tune-away period are executable by the one or more processors to cause the UE to:
   perform the one or more neighbor cell measurements in a radio resource control connected mode during the tune-away period.

3. The UE of claim 1, wherein the instructions executable by the one or more processors to cause the UE to perform the one or more neighbor cell measurements during the tune-away period are executable by the one or more processors to further cause the UE to:
   tune away from a first carrier to a second carrier; and
   perform the one or more neighbor cell measurements on the second carrier.

4. The UE of claim 1, wherein the instructions are executable by the one or processors to further cause the UE to:
   transmit, to the network entity, a UE capability message that indicates a capability of the UE relating to neighbor cell measurements in a radio resource control connected mode.

5. The UE of claim 4, wherein the UE capability message indicates that the UE requires the tune-away period to perform the neighbor cell measurements in the radio resource control connected mode, and wherein the UE capability message indicates a duration associated with the tune-away period.

6. The UE of claim 1, wherein the request for the tune-away period is included in a protocol data unit.

7. The UE of claim 1, wherein the request for the tune-away period includes at least one of a requested duration of the tune-away period or a type of neighbor cell measurement associated with the tune-away period.

8. The UE of claim 1, wherein the indication is included in a downlink control channel communication or a MAC protocol data unit.

9. The UE of claim 1, wherein the indication is an implicit indication provided by the network entity not scheduling an uplink communication or a downlink communication in a physical downlink control channel period.

10. A network entity for wireless communication, comprising:
    one or more memories; and
    one or more processors coupled to the one or more memories, the one or more memories comprising instructions executable by the one or more processors to cause the network entity to:
       receive, from a user equipment (UE), a request for a tune-away period to perform one or more neighbor cell measurements, wherein the one or more neighbor cell measurements are performed to detect one or more neighbor cells based at least in part on one or more synchronization signals, and wherein the request is included in a medium access control (MAC) control element (CE);
       transmit an indication responsive to the request that the tune-away period is available, the indication indicating that the tune-away period is to begin when at least one of a scheduled uplink activity or a scheduled downlink activity is complete; and
       avoid scheduling downlink and uplink activity for the UE during the tune-away period to begin when the at least one of the scheduled uplink activity or the scheduled downlink activity is complete.

11. The network entity of claim 10, wherein the instructions are executable by the one or more processors to further cause the network entity to:
    receive, from the UE, a UE capability message that indicates a capability of the UE relating to neighbor cell measurements in a radio resource control connected mode.

12. The network entity of claim 10, wherein the request for the tune-away period is included in a protocol data unit.

13. The network entity of claim 10, wherein the request for the tune-away period includes at least one of a requested duration of the tune-away period or a type of neighbor cell measurement associated with the tune-away period.

14. The network entity of claim 10, wherein the indication is included in at least one of a downlink control channel communication or a MAC protocol data unit.

15. A method of wireless communication performed by a user equipment (UE), comprising:
    transmitting, to a network entity, a request for a tune-away period to perform one or more neighbor cell measurements, wherein the request is included in a medium access control (MAC) control element (CE);
    receiving an indication responsive to the request that the tune-away period is available, the indication indicating that the tune-away period is to begin when at least one of a scheduled uplink activity or a scheduled downlink activity is complete; and performing the one or more neighbor cell measurements to detect one or more neighbor cells based at least in part on one or more synchronization signals, wherein the one or more neighbor cell measurements are performed during the tune-away period based at least in part on the indication.

16. The method of claim 15, wherein the performing the one or more neighbor cell measurements during the tune-away period comprises:
performing the one or more neighbor cell measurements in a radio resource control connected mode during the tune-away period.

17. The method of claim 15, wherein the performing the one or more neighbor cell measurements during the tune-away period comprises:
tuning away from a first carrier to a second carrier; and
performing the one or more neighbor cell measurements on the second carrier.

18. The method of claim 15, further comprising:
prior to the receiving the indication that the tune-away period is available, transmitting, to the network entity, a UE capability message that indicates a capability of the UE relating to neighbor cell measurements in a radio resource control connected mode.

19. The method of claim 18, wherein the UE capability message indicates that the UE requires the tune-away period to perform the neighbor cell measurements in the radio resource control connected mode, and wherein the UE capability message indicates a duration associated with the tune-away period.

20. The method of claim 15, wherein the request for the tune-away period is included in a protocol data unit.

21. The method of claim 15, wherein the request for the tune-away period includes at least one of a requested duration of the tune-away period or a type of neighbor cell measurement associated with the tune-away period.

22. The method of claim 15, wherein the indication is included in a downlink control channel communication or a MAC protocol data unit.

23. The method of claim 15, wherein the indication is an implicit indication provided by the network entity not scheduling an uplink communication or a downlink communication in a physical downlink control channel period.

24. A method of wireless communication performed by a network entity, comprising:
receiving, from a user equipment (UE), a request for a tune-away period to perform one or more neighbor cell measurements, wherein the one or more neighbor cell measurements are performed to detect one or more neighbor cells based at least in part on one or more synchronization signals, and wherein the request is included in a medium access control (MAC) control element (CE);
transmitting an indication responsive to the request that the tune-away period is available, the indication indicating that the tune-away period is to begin when at least one of a scheduled uplink activity or a scheduled downlink activity is complete; and
avoiding scheduling downlink and uplink activity for the UE during the tune-away period to begin when the at least one of the scheduled uplink activity or the scheduled downlink activity is complete.

25. The method of claim 24, further comprising:
receiving, from the UE, a UE capability message that indicates a capability of the UE relating to neighbor cell measurements in a radio resource control connected mode.

26. The method of claim 24, wherein the request for the tune-away period includes at least one of a requested duration of the tune-away period or a type of neighbor cell measurement associated with the tune-away period.

27. The UE of claim 1, wherein the request indicates that the tune-away period is for a cell detection measurement to detect the one or more neighbor cells.

28. The network entity of claim 10, wherein the indication is an implicit indication provided by the network entity not scheduling an uplink communication or a downlink communication in a physical downlink control channel period.

29. The method of claim 15, wherein the request indicates that the tune-away period is for a cell detection measurement to detect the one or more neighbor cells.

30. The method of claim 24, wherein the indication is an implicit indication provided by the network entity not scheduling an uplink communication or a downlink communication in a physical downlink control channel period.

* * * * *